Figure 1:
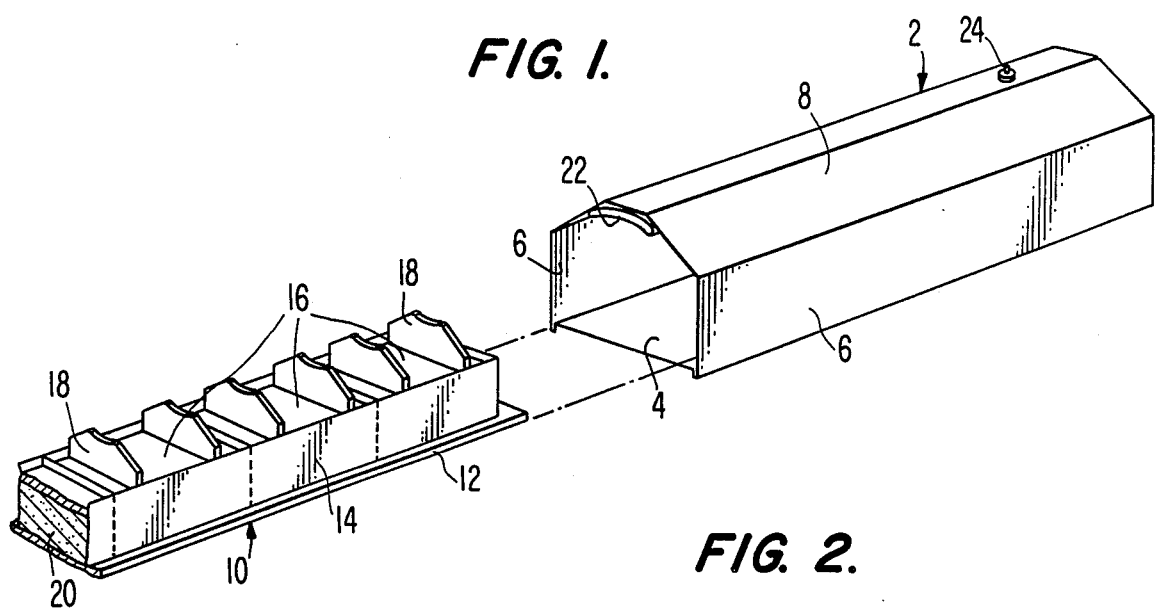

United States Patent [19]

Bjerre et al.

[11] Patent Number: 4,817,515

[45] Date of Patent: Apr. 4, 1989

[54] CHEESE PRESS

[76] Inventors: Poul Bjerre, Ballevej 2, Silkeborg; Per Busk, Skön Valborgsvej 2, Vejle; Knud Gasbjerg, Grundtvigsvej 8; Curt Meinild, Färgevej, both of Silkeborg, all of Denmark

[21] Appl. No.: 822,257

[22] Filed: Jan. 24, 1986

Related U.S. Application Data

[63] Continuation of Ser. No. 413,337, Aug. 16, 1982, abandoned.

[51] Int. Cl.$^4$ ............... A01J 25/00; A01J 25/12; A23C 19/00
[52] U.S. Cl. ............................. 99/454; 99/453; 99/456; 99/460; 100/194; 100/269 A; 100/278; 249/84; 249/118; 249/141; 425/85; 426/582
[58] Field of Search ............. 99/452–454, 99/456–460, 465, 472; 220/4 F, 1.5; 426/582, 491, 414; 206/508, 509; 100/113–116, 193, 194, 211, 278, 269 R, 269 A; 249/81, 84, 118, 141; 425/84, 85, 302.1, 206, 347

[56] References Cited

U.S. PATENT DOCUMENTS

| | | | |
|---|---|---|---|
| 1,849,457 | 3/1932 | Johns | 249/81 |
| 2,022,828 | 12/1935 | Samuel | 249/118 |
| 2,266,336 | 12/1941 | Royer | 425/84 |
| 3,155,030 | 11/1964 | Curtis | 100/194 |
| 4,111,110 | 9/1978 | Smith | 99/456 |
| 4,152,101 | 5/1979 | Charles | 425/85 |
| 4,393,766 | 7/1983 | Thies | 100/269 A |
| 4,437,787 | 3/1984 | Van der Ploeg et al. | 99/458 X |
| 4,580,961 | 4/1986 | Jensen | 425/84 |
| 4,603,623 | 8/1986 | LeGuen et al. | 99/454 |
| 4,608,921 | 9/1986 | Mongiello, Sr. | 99/455 |

FOREIGN PATENT DOCUMENTS

| | | |
|---|---|---|
| 2078129 | 11/1971 | France . |
| 2278488 | 3/1976 | France . |
| 7812311 | 2/1979 | Sweden . |

*Primary Examiner*—Timothy F. Simone
*Attorney, Agent, or Firm*—Antonelli, Terry & Wands

[57] ABSTRACT

A cheese press for a plurality of rows of cheese moulds is constituted by a plurality of individual cassette shaped pressing units (30) each adapted to receive a row of moulds or mould batteries and each ceilingwise provided with pressing means (68) for pressing the moulds. Each of these units can be made as a lightweight construction e.g. of stainless sheet steel and is preferably made as a heat insulated tube, which is endwise closable so as to be vacuum resistent. Especially the production of Cheddar cheese is highly accelerated when the pressing is effected under vacuum. The cassette units may be arranged in a conveyor system for consecutive cooperation with a loading and unloading station, or they may be arranged more or less stationarily for cooperation with means for transporting the moulds to and from the cassette units.

19 Claims, 2 Drawing Sheets

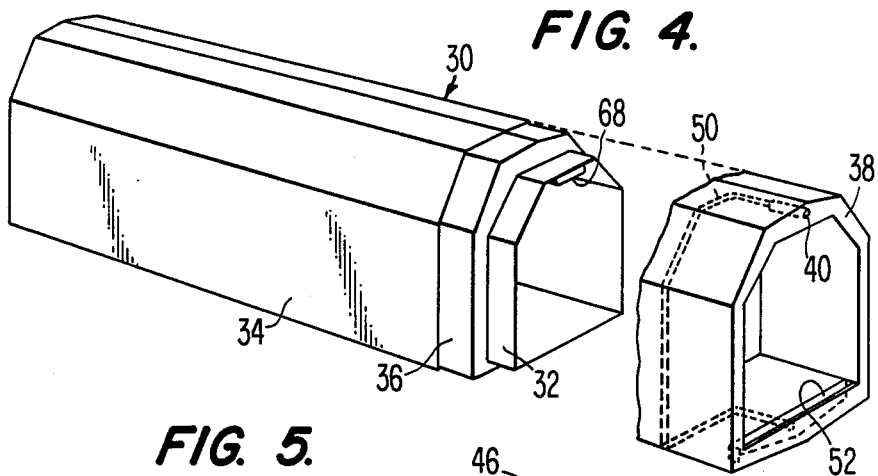
FIG. 4.
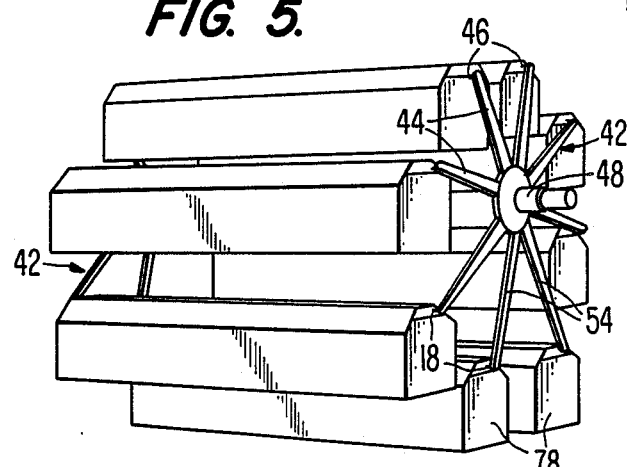
FIG. 5.
FIG. 6.
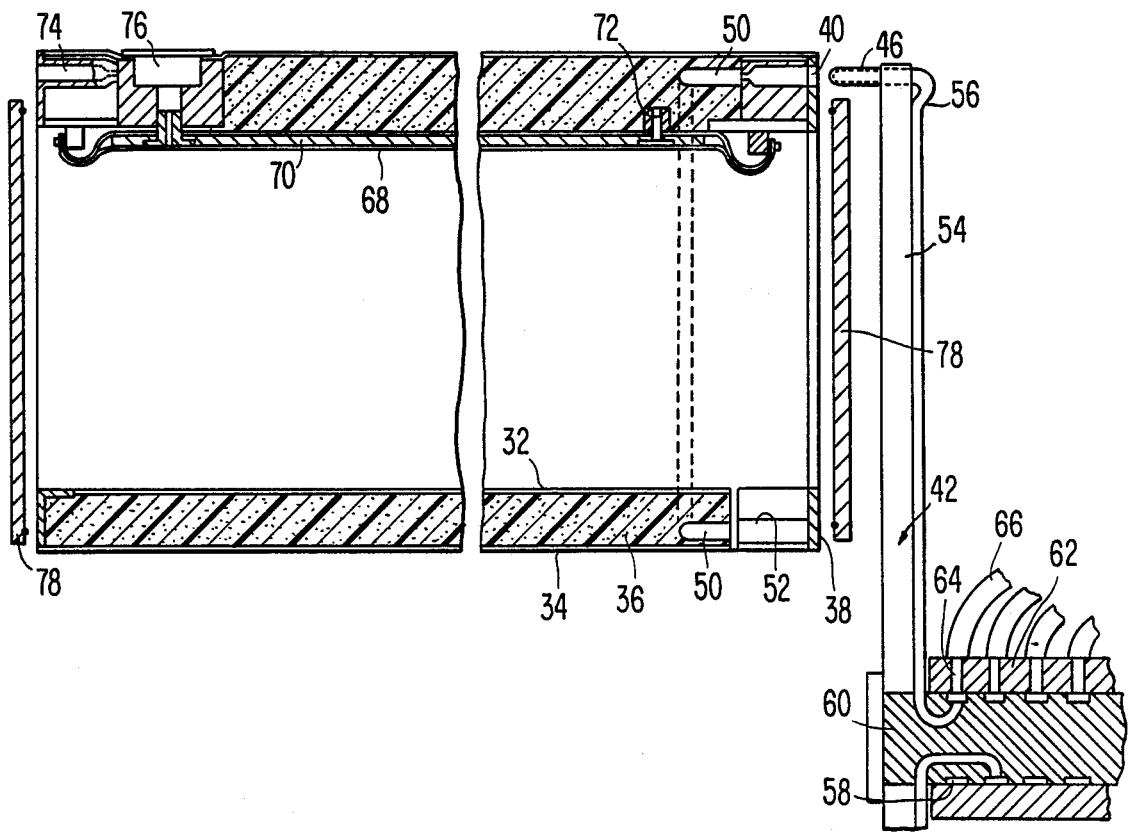

CHEESE PRESS

This is a continuation of application Ser. No. 413,337, filed Aug. 16, 1982.

The present invention relates to a cheese press having support means for a plurality of cheese moulds and pressure exerting means mounted on yoke means above the support means.

The cheese press as a special apparatus type has, during the later years, gone through an excessive development, which is partly connected with a development of the moulds in which the cheese members are pressed. Originally, a plurality of single moulds were used, which were stacked in piles such that the bottom of one mould was supported on the pressing lid of the underlying mould, whereby a whole pile could be pressed between a lower support and an upper pressure exerting means of the cheese press itself. Later on, the development has gone in the direction of the so-called tunnel presses, in which the moulds are pressed in a single layer by means of upper pressing members mounted, e.g., adjustably in a ceiling structure of the tunnel press, such that a press having a considerable horizontal area may handle a high number of cheese moulds, which may be brought to and from the press in an easy and automatic manner. This development has been actuated by the fact that the singular moulds have been developed towards so-called mould batteries consisting of several coherent moulds or a latticework of mould side walls removably mounted on a common bottom plate element.

The invention is a further development of the tunnel press apparatus type, as for various reasons it is still considered suitable to effect the pressing of a single broad layer of moulds accepting that the press itself shows considerable horizontal dimensions. Presses of this type are normally designed with a broad elongated pressing table for receiving the moulds in crosswise oriented rows, the upper pressing members being mounted on transverse yokes, i.e. rowwise along and above the rows of moulds, these suitably being constituted by the mould batteries. The yokes may be mounted so as to be adjustable in the length direction of the press, whereby they will be adjustably positioned corresponding to the actual widths of the transversely elongated mould rows, and for a given breadth of the press the press may comprise additional yokes to be mounted when a high number of narrow mould rows are to be pressed. Moreover, the pressing means may be adjustable in the length direction of the yokes, i.e. in the cross direction of the press, whereby a press of the type in question may show a high degree of flexibility with respect to the pressing of moulds of various sizes and with a high degree of utilization of the area conditioned capacity of the pressing table.

Suitably such presses may be produced with certain standard widths, whereby the associated yokes will be usable as standard elements irrespectively of the length of the press. From a construction point of view, the length of the pressing table is not critical, while the width is connected with the specific circumstance that the yokes, which span the entire width of the table, have to be made with considerably increasing strength, the broader the pressing table is. In practice this will mean a real limitation of the usable width of the press or, respectively, a high price of the press already for such a width thereof, which is to be considered as a reasonable minimum already for normal practical use of the press.

The purpose of the invention is to provide a cheese press based on an entirely new concept, according to which the press may be produced in a relatively cheap manner without principal limitations of the length or the breadth of the pressing table or the elements of the invention comparable thereto.

The cheese press according to the invention is characterized by at least one pressing unit for receiving cheese moulds, the at least one pressing unit comprising an elongate and continuous tube-like housing including a bottom portion for supporting cheese moulds, longitudinal side wall portions and a roof portion, the longitudinal side wall portions and roof portion of the housing being formed as an integral structure engage with the bottom portion along the longitudinal edges thereof, the housing being adapted to permit introduction of cheese moulds through an end thereof, pressure exerting means located within the housing adjacent the roof portion and actuatable from outside the housing to exert pressure towards the bottom portion, whereby a cheese mould can be introduced into the housing and pressed between the pressure exerting means and the bottom portion of the housing. With such a design it will no longer be necessary to make use of any materially integral pressing table, because this table will be constituted by the sum of the corresponding individual bottom portions of the single cassettes, and even the discussed transverse yokes will be eliminated, because the effective "yoke" above the cassette bottom will be constituted by the relatively narrow constructional cross section of the cassette itself, i.e. the "yoke" will have to bridge, as a standard, the width of one or very few mould rows only, whereby the yoke portion will be of a very short length. For achieving the necessary strength of the yoke, therefore, the yoke may be designed in a simple and relatively very weak manner, e.g. consisting of a thin sheet material only, as suitable for a cassette-like structure, and the yoke design will be entirely independent of the length of the cassette. Typically the length of the cassettes will be comparable with the width of a conventional pressing table, when the rows of the moulds are imagined to be arranged transversely thereon, and it is hereby a remarkable advantage of the invention that there will be no practical constructional restrictions as to the "width" of the press.

This lack of width restriction will show no counterpart as to restrictions of the length of the press, because this "length" will just be the sum of widths of the cassettes when these are placed in a horizontal row side by side. The cassettes need not, however, be arranged in a common horizontal plane, as they may be handled individually, i.e. placed in arbitrary or desired mutual positions for accomodating local space facilities. Advantageously the cassettes are connected or connectable with suitable conveyor means for moving the cassettes successively past a loading station and an unloading station, in which moulds or mould batteries are introduced into and removed from the cassettes, respectively.

According to the invention the cassettes may be heat insulated, whereby special temperature conditions may be created locally inside the cassettes, this being an important aspect of the invention.

The small overall cross section of the cassettes conditions another very important aspect of the invention, viz. that the cassettes may easily be constructed so as to be vacuum resistent when sealingly closed by a removable cover at one or both ends. Thereby the cassettes according to the invention will be particularly well suited for the processing of cheese members of the Cheddar cheese type which require a relatively high pressing force and a vacuum treatment. Normally the Cheddar cheese members are pressed during 4–6 hours or more and are thereafter subjected to a vacuum treatment in a special vacuum chamber for a period of about 20 minutes. When, according to the invention, the pressing treatment is carried out under vacuum in the cassettes, then it is possible to avoid the use of any special vacuum chamber, and experiments have shown it is thereby possible to reduce the pressing time by as much as 50% or more.

A further important aspect of the invention is that the cassettes, despite their considerable length, may be connectable as self supporting units, whereby they will be connectable in a conveyor system having means for suspending the cassettes solely endwise thereof, such that no further support means are necessary and such that the cassettes are movable in a paternoster-like manner. Suspension means for pin-and-socket-connection with the cassettes may be used additionally as operative connections for various purposes, e.g. supplying pressure medium to the internal pressing means, drainage of whey by suction from outside, or conditioning the internal climate in the cassettes.

An advantageous and preferred cassette construction comprises an interior tube of thin stainless sheet material which is surrounded by a rigid insulation material such as polyurethane foam, the outer side of which is covered by an exterior tube of stainless sheet material, the unit being manufactured by foaming up the insulation foam between the two tubes, whereby a heat insulated, vacuum resistent and self supporting cassette is produceable in a very simple manner.

Figure 2:
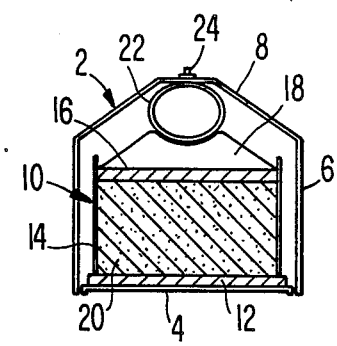
Figure 3:
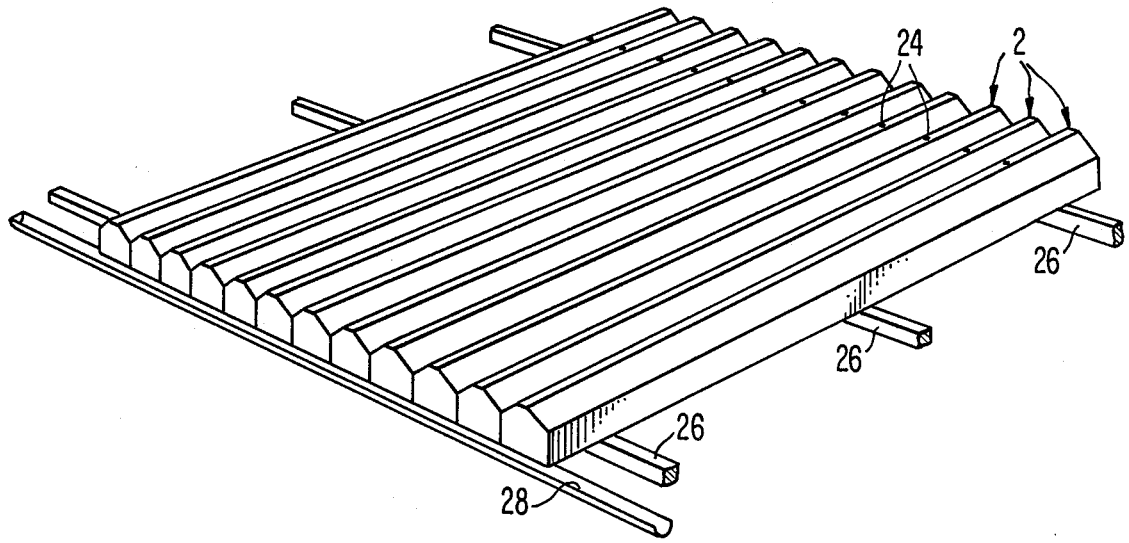

In the following the invention is described in more detail with reference to the accompanying drawing, in which:

FIG. 1 is a perspective view of a portion of a mould battery and a cassette belonging to a cheese press according to the invention, FIG. 2 is a cross section of the cassette, FIG. 3 is a perspective view of a complete press apparatus according to the invention, FIG. 4 is a perspective view, partly in section, of a cassette of a preferred design, FIG. 5 is a perspective view of a suspension arrangement for several cassettes, and FIG. 6 is a longitudinal sectional view of the cassette shown in FIG. 4.

In FIGS. 1 and 2 is shown an elongate tubular cassette 2 made of stainless sheet material and having a bottom 4, side walls 6 and an arched roof 8. The cassette is open in at least one end and is adapted to receive one or more mould batteries 10 each comprising a bottom part 12, a mould side wall frame element 14 and a number of pressing lids 16, one for each mould of the battery. The lids 16 have an upstanding pressing shoe 18, through which the lids are operable to be forced down onto the cheese mass 20 as filled into the respective moulds.

At the underside of the cassette roof 8 is mounted a hose 22 which projects along the roof and is connected with a valve stub 24, through which a pressure medium, preferably compressing air, is introduceable into the hose 22 from an exterior source. The hose is in known manner manufactured in such a manner, e.g. by having inner or outer spring means, that in its natural position or a sucked empty position it will assume a collapsed flat shape as shown in FIG. 1, whereby it will not obstruct the free introduction or removal of the mould battery 10, while in its actuated position, FIG. 2, it acts as an effective pressing member for biasing the mould lids 16 through the pressing shoes 18.

During the pressing operation the thickness of the cheese mass members 20 will be reduced while whey escapes from the moulds through the perforated walls thereof, and it will be necessary, therefore, to readjust the pressure in the hose 22. Such readjustment is easily possible through the valve stub 24 in a fully or semi automatic or even manual manner.

As shown in FIG. 3 the operative cassettes may be laid on carrier rails 26, preferably slightly inclined for draining off the whey through one end of the cassettes down into a common receiver drain 28. Upon termination of the pressing operation the pressing force is relieved and the mould batteries are drawn or pushed out of the cassettes for demoulding of the pressed cheeses.

The invention may form the basis of almost infinite possibilities with respect to the detailed design of the cassettes and their possible integration with the mould battery bottom elements, the detailed design and control of the pressing means, the manner of supporting the cassettes and moving them in a closed or open conveyor system, the manner of arranging the cassettes in a more or less compact pattern during the pressing operation, etc. Furthermore, many possibilities will exist for the detailed and even principal design of associated stations for loading and unloading the cassettes and for cleaning the cassettes, by exterior or interior cleaning systems.

Though the cassettes are primarily adapted to work with a single row of moulds nothing will exclude, of course, that two or a few rows may be housed in the cassettes side by side and/or piled on each other. The length of each cassette is preferably at least four times its width. Instead of the integrated cassette bottom 4 to the bottom structure may be a separate member, while the side walls 6 may have lower edge portions for releasably engaging with the bottom member or even directly with the mould bottom members 12. Hereby the cassette "yoke" 6,8 may be mounted even without axial displacement relative the bottom members 4 or 12, this also being achievable if the cassettes are openable in some other manner.

The pressing means generally should just fulfil their purpose of forcing the lids 16 downwardly and/or the moulds upwardly. Besides, with the press according to the invention there is no condition as to conventional up/down orientation of the moulds, because the cassettes during the pressing operation may be brought to assume any orientation in the space and may even with advantage be rotated about their longitudinal axis when located horizontally, since this would promote a uniformly distributed treatment of the cheese members.

With the use of pressure medium actuated pressing means it will be possible to provide on each cassette a pressure medium reservoir which is operable to adjust the operational pressure in a preprogrammed manner governed by a central or a local control unit. The pressing force may be applied between the cassette bottom and the entire yoke portion 6,8, even with pressing means located on the outside of the cassette.

FIG. 4 shows a preferred design of the cassette, designated 30. It consists of an interior tubular member 32 of thin stainless steel sheet material and a corresponding hard surface layer or exterior tube member 34, the cylindrical space between these tube members being filled with a rigid insulating foam material 36 such as polyurethane foam, which is preferably foamed up in situ between the two concentrically parallel tube members 32 and 34. Endwise the said cylindrical space is covered by an annular cover plating 38 of stainless steel, whereby all exposed surface portions of the cassette consist of stainless material.

The cassette is provided with a hole 40 in the uppermost end surface portion thereof, at both ends, whereby the cassette may be suspended on opposed pins of a carrier structure when these pins are introduced into the holes 40, and due to the rigidity of the foam material 36 as assisted by the stiffness of the thin walled material of the inner and outer tube members 32 and 34 the cassette will be self supporting all the way between the opposed suspension holes 40. This means that the cassette may be supported solely by carrier pins introduced into these holes.

The holes 40, therefore, condition the use of a simple suspension or storage system which may comprise, as shown in FIG. 5, a pair of opposed star wheels 42 having radial arms 44 provided with outer pins 46 operable to be introduced into the holes 40 by a mutual axial displacement of the opposed star wheels 42. A complete cheese press system may comprise several sets of star wheels 42, the hubs 48 of which may be carried by bearings arranged in a conveyor system, whereby the various star wheel sets are movable past a stationary loading station, in which cheese moulds or mould batteries are inserted into the consecutive cassettes during stepwise rotation of the star wheels, in which the cassettes are suspended paternosterwise.

FIG. 4 shows that the bottom or inner end of the hole 40 may be connected with a pipe 50 which projects through the foam material 36 down to the bottom of the cassette, where the other end of the pipe is connected with the lower portion of an upwardly open transverse groove 52 adjacent one end (or both ends) of the bottom of the cassette. Hereby it will be possible to remove the whey as liberated during the pressing process by sucking it up from the groove 52 by means of suction applied to the hole 40, i.e. to an axial channel through the respective carrier pin 46. Thus, the whey may be drained off through a pipe system located on the respective star wheel 42 and connected to a stationary suction source through a flexible or twistable hose or through a rotary sub bearing pipe connection.

An example of the last mentioned arrangment is shown in FIG. 6, where a radial arm 54 on the star wheel 42 is provided with a pipe 56, the outer end of which is connected to a central bore through the pin 46, while the other or inner end of the pipe 56 is connected with a bottom portion of an annular groove 58 in the outside of a central hub shaft 60 of the star wheel 42. A bearing bushing 62 surrounds the shaft 60 and is provided with a radial hole 64 communicating with the annular groove 58 and connected with an exterior, stationary pipe connection 66 to a non-illustrated vacuum source.

For effecting drainage suction of whey from the various cassettes suspended in a single set of star wheels 42 it would be sufficient that the suction pipes 56 of all the radial arms 54 of the star wheel be connected to the groove 58 of the shaft 60, but according to the invention it is preferable to arrange for each single radial arm 54 to have its suction pipe 56 connected with a separate annular groove 58 on the hub shaft 60. As illustrated in FIG. 6 it is hereby possible to connect the suction pipe 56 of each of the cassettes as suspended by the star wheel with individual stationary suction pipes 66, which are correspondingly individually connectable with the said suction source through suitable valve means, whereby suction may be applied individually to the various cassettes as suspended by the star wheel. This arrangement shows the important advantage that the drainage suction of the whey may be controlled so as to be initiated immediately upon the single cassette having been charged with cheese moulds and the pressing thereof has been initiated, without waiting for the following charged cassettes to initiate the effective cheese pressing condition.

A top mounted pressure exerting hose is known in collapsed condition at 68 in FIG. 6, carried by an internal upper beam 70 secured to the ceiling of the cassette by means of holding screws 72. The interior of the hose 68 is connected to a socket 74 which is provided symmetrically opposite to the suspension hole 40, whereby it may itself act as a corresponding suspension hole to be engaged by a carrier pin constituting a supply plug for admission of compressed air to the hose 68. The socket 74 is connected to the hose through a pressure relief valve 76.

The said air supply plugs may be arranged and pipe connected fully similar to the combined carrier and suction pins 46, whereby the cheese pressing may be controlled individually for each single cassette.

As shown in FIG. 5, and particularly in FIG. 6, the the planar end surfaces of the cassettes may be adapted to each support a cover plate 78 in a vacuum sealing manner, whereby each single cassette may be evacuated during the pressing operation. The air may be sucked out through a separate evacuation stub (not shown) or even through one of the holes 40 or 74, when suitable switch over means are used. Due to their design as shown in FIG. 4 the cassettes are easily made so as to resist a considerable vacuum.

As mentioned, the use of vacuum during the very cheese pressing operation obviates a subsequent treatment of the cheeses in a special vacuum chamber, and experiments seem to prove that the necessary pressing time for Cheddar cheese may be reduced drastically when the cheeses are pressed under vacuum. It will be appreciated that both the active pressure and the vacuum as well as the pressing time may be accurately and individually adjusted for each single cassete.

Another very important possibility is to provide desired, special thermal conditions inside the cassettes during the pressing operation. This can be done by blowing warm or cold air into or through the cassettes, but preferably the heating or cooling is effected by sending a heating or cooling medium through a tube coil arranged about the cassette or the inner tubular portion 32 thereof. Thereby the heating or cooling will be primarily on radiation, which is advantageous both when the pressing is made under vacuum and when the pressing time is relatively short as otherwise made possible by the invention.

According to the invention it is particularly advantageous to effect a cooling of the cheeses during the pressing operation, since experiments have shown that the cheese members are more easily formed with the desired sharp corners when their surface temperature is held at some 10° C.

It will be appreciated that the cassette structure of each single sub-unit of the entire press system generally facilitates the provision of any desired special climate in the immediate surroundings of the cheeses being pressed, and it will not be necessity by the pressing time which is the primary parameter. Thus, the cheese members may be stored in the cassettes during a time interval longer than required for their pressing, should it be desirable to subject them to some other treatment (vacuum, temperature, humidity, atmosphere composition) during a time interval of increased length.

In the foregoing it has been stressed that the cassettes are arrangeable in a movable system, whereby they will be consecutively movable in a direction crosswise to their length direction past various operation stations, e.g. for being loaded with cheese moulds or mould batteries, but it will be within the scope of the invention to arrange for the cassettes to be placed more or less stationarily in suitable rack means, whereby the operations of loading and unloading the cheese moulds or mould batteries may be effected by mould handling and conveying means arranged outside the said rack for endwise cooperation with the various cassettes in the rack system.

We claim:

1. A cheese press comprising at least one pressing unit for receiving cheese moulds, said at least one pressing unit comprising an elongate and continuous tube-like housing including a bottom portion for supporting cheese moulds, longitudinal side wall portions and a roof portions, the longitudinal side wall portions and roof portion of the housing being formed as an integral structure engaged with said bottom portion along the longitudinal edges thereof, said housing being adapted to permit introduction of cheese moulds through an end thereof, pressure exerting means located within said housing adjacent said roof portion and actuatable from outside said housing to exert pressure towards said bottom portion, wherein the pressure exerting means comprises an inflatable hose mounted lengthwise in said housing, and whereby a cheese mould can be introduced into said housing and pressed between said pressure exerting means and said bottom portion of said housing.

2. A cheese press comprising at least one pressing unit for receiving cheese moulds, said at least one pressing unit comprising an elongate and continuous tube-like housing including a bottom portion for supporting cheese moulds, longitudinal side wall portions and a roof portion, the longitudinal side wall portions and roof portion of the housing being formed as an integral structure engaged with said bottom portion along the longitudinal edges thereof, said housing being adapted to permit introduction of cheese moulds through an end thereof, wherein said housing is constructed as a substantially closed tubular unit having walls made of sheet material, at least one end of said tubular unit being opened or openable and said tubular unit being designed so as to be vacuum resistant, and pressure exerting means located within said housing adjacent said roof portion and actuatable from outside said housing to exert pressure towards said bottom portion, whereby a cheese mould can be introduced into said housing and pressed between said pressure exerting means and said bottom portion of said housing.

3. A cheese press comprising at least one heat insulated pressing unit for receiving cheese moulds, said at least one heat-insulated pressing unit comprising an elongate and continuous tube-like housing including a bottom portion for supporting cheese moulds, longitudinal side wall portions and a roof portion, the longitudinal side wall portions and roof portion of the housing being formed as an integral structure engaged with said bottom portion along the longitudinal edges thereof, said housing being adapted to permit introduction of cheese moulds through an end thereof, pressure exerting means located within said housing adjacent said roof portion and actuatable from outside said housing to exert pressure towards said bottom portion, whereby a cheese mould can be introduced into said housing and pressed between said pressure exerting means and said bottom portion of said housing.

4. A cheese press according to claim 2 or 3, wherein said housing is made as a tubular sandwich construction comprising an interior tube of thin stainless sheet material which is surrounded by a rigid insulating polyurethane foam, said rigid insulating polyurethane foam being surrounded by a hard surface layer.

5. A cheese press according to claim 2, wherein each pressing unit is provided with suspension means adjacent the opposed ends thereof and is designed so as to be self-supporting between said suspension means.

6. A cheese press according to claim 5, wherein said suspension means are constituted by holes extending in the longitudinal direction of the pressing unit for receiving respective suspension pins belonging to a conveyor system for moving said pressing units in a paternoster like manner.

7. A cheese press according to claim 2, wherein said side wall portions, said roof portion and said bottom portion are formed as a tubular unitary structure.

8. A cheese press according to claim 2, wherein said bottom portion is removably engaged with said integral structure of said side wall portions and said roof portion.

9. A cheese press according to claim 2, wherein the internal dimensions of said housing are such as to permit the introduction of only a single row of moulds arranged end-to-end and extending along the length of the housing.

10. A cheese press according to claim 2, wherein said housing has a length and a width and said length is not less than four times said width.

11. A cheese press according to claim 2, wherein said housing is constructed of sheet material.

12. A cheese press according to claim 2, wherein sid housing includes end walls and at least one of said end walls is openable to permit the introduction of moulds.

13. A cheese press according to claim 2, wherein the construction of said housing and said at least one openable end wall is such as to render the housing vacuum tight.

14. A cheese press according to claim 4, wherein said hard surface layer is an exterior tube of thin sheet stainless steel.

15. A cheese press according to claim 6, wherein said holes are in communication with the interior of the pressing unit for enabling operationable communication between the unit interior and conditioning means connected by way of said pins.

16. A cheese press according to claim 3, wherein each pressing unit is provided at one or both ends with lower liquid collecting means, said collecting means being connected by a pipe to an externally located coupling for connection to a source of suction.

17. A cheese press according to claim 2, comprising a plurality of pressing units.

18. A cheese press according to claim 17, wherein said pressing units are arranged on a stationary support structure with a respective longitudinal axes extending substantially parallel to each other, and further comprising mould handling and conveying means located externally of said support structure and adapted to cooperate with the ends of said pressing units for loading or unloading cheese moulds into or from the pressing units.

19. A cheese press according to claim 18 wherein said pressing units are arranged in a system so as to be movable crosswise to their longitudinal direction past one or more stationary operation stations primarily for loading or unloading cheese moulds to or from said pressing means.

* * * * *